United States Patent [19]
Lew

[11] Patent Number: 5,477,737
[45] Date of Patent: Dec. 26, 1995

[54] OSCILLATORY PRESSURE TRANSDUCER

[76] Inventor: Hyok S. Lew, 7890 Oak St., Arvada, Colo. 80005

[21] Appl. No.: 248,354

[22] Filed: May 24, 1994

Related U.S. Application Data

[63] Continuation-in-part of Ser. No. 34,516, Mar. 19, 1993, which is a continuation-in-part of Ser. No. 772,964, Oct. 8, 1991, Pat. No. 5,214,965, and a continuation of Ser. No. 860,767, Mar. 23, 1992, abandoned.

[51] Int. Cl.$^6$ ..................................................... G01F 1/32
[52] U.S. Cl. ........................................ 73/704; 73/861.24
[58] Field of Search ........................... 73/861.21, 861.22, 73/861.24, 704

[56] References Cited

U.S. PATENT DOCUMENTS

| | | | |
|---|---|---|---|
| 4,440,027 | 4/1984 | Focht | 73/861.24 |
| 4,475,405 | 10/1984 | Corpron et al. | 73/861.24 |
| 4,835,436 | 5/1989 | Lew | 310/338 |
| 4,888,991 | 12/1989 | Lew | 73/658 |
| 5,123,282 | 6/1992 | Ikeda et al. | 73/704 |

OTHER PUBLICATIONS

Application 08/280216–Lew.

*Primary Examiner*—Richard Chilcot
*Assistant Examiner*—Jewel V. Artis

[57] ABSTRACT

A transducer converting an oscillation in fluid pressure into an alternating electrical signal comprises a transducer body including a first pressure compartment disposed intermediate a second and third pressure compartment, and separated by from the second and third pressure compartments respectively by two thin partitioning walls, and a relative vibratory motion sensor detecting the relative vibratory deflection between the two thin partitioning walls, wherein the relative vibratory motion sensor generates an alternating electrical signal representing the oscillation in fluid pressure existing in at least one of two pressures respectively introduced into the first pressure compartment and into the combination of the second and third pressure compartments.

20 Claims, 4 Drawing Sheets

OSCILLATORY PRESSURE TRANSDUCER

This application is a Continuation-In-Part Application to patent application Ser. No. 08/034,516 entitled "Piezo Electric Relative Vibration Sensor" filed on Mar. 19, 1993, that is a Continuation-In-Part to patent application Ser. No. 07/772,964 now U.S. Pat. No. 5,214,965 filed on Oct. 8, 1991, and a Continuation to patent application Ser. No. 07/860,767 filed on Mar. 23, 1992 now abandoned.

FIELD OF INVENTION

This invention relates to a transducer that converts an oscillation or fluctuation in the fluid pressure into an alternating electrical signal, which transducer has a particularly useful application in detecting the frequency of vortex shedding taking place in the vortex shedding flowmeter.

BACKGROUND OF INVENTION

In the type of vortex flowmeters employing a vortex generator-sensor, the frequency of a fluctuating fluid dynamic force or fluctuating fluid pressure produced by vortex shedding from the vortex generating bluff body is measured by detecting the fluctuating fluid dynamic force experienced by the vortex generating bluff body or by detecting the fluctuating fluid dynamic pressure tapped through pressure transmitting holes included in the vortex generating bluff body. The existing versions of the vortex flowmeters employing the vortex generator-sensor have performance inferior to the other type of vortex flowmeters employing a vortex generating bluff body and a separate vortex sensing planar member disposed downstream of the bluff body, which type of the vortex flowmeters measures the vortex shedding frequency by detecting the alternating fluid dynamic lift force generated by the vortex shedding and experienced by the vortex sensing planar member. A new generation transducer converting the fluctuating fluid pressure associated with the vortex shedding from the bluff body and existing in a vicinity of the bluff body into an alternating electrical signal with a very high degree of sensitivity and an outstanding immunity to the noise created by mechanical vibrations can elevate the level of performance of the vortex flowmeter employing the vortex generator-sensor to that of the vortex flowmeter employing a vortex generator and a vortex sensor disposed downstream of the vortex generator.

BRIEF SUMMARY OF INVENTION

The primary object of the present invention is to provide an oscillatory pressure transducer comprising a first pressure compartment disposed intermediate a second and third pressure compartments; wherein two thin partitioning walls respectively separate the first pressure compartment from the second and third pressure compartments, and a piezo electric relative motion sensor detecting the relative deflection between the two thin partitioning walls; wherein the first pressure compartment includes a first pressure port introducing a fluid pressure thereinto, and the second and third pressure compartments have a second common pressure port introducing another fluid pressure thereinto. An alternating electrical signal generated by the piezo electric relative motion sensor represents the oscillation in the fluid pressure introduced through at least one of the first and second pressure ports.

Another object is to provide a oscillatory pressure transducer described in the afore-mentioned primary object of the present invention, that further comprises a fourth pressure compartment disposed intermediate the third and a fifth pressure compartments, wherein another pair of thin partitioning walls respectively separates the fourth pressure compartment from the third and fifth pressure compartment, and another piezo electric relative motion sensor detecting the relative deflection between the another pair of thin partitioning walls; wherein the fourth pressure compartment includes a third pressure port introducing a fluid pressure thereinto, and the second pressure port is also open to the fifth pressure compartment. Two alternating electrical signals respectively generated by the two piezo electric relative motion sensors represents the oscillation in the fluid pressure introduced through at least one of the first and third pressure ports.

A further object is to provide the oscillatory pressure transducer described in the afore-mentioned primary object of the present invention; wherein the piezo electric relative motion sensor comprises a piezo electric element container vessel including a cavity with two thin opposite walls disposed parallel to and straddling a plane of symmetry located intermediate and parallel to the two thin partitioning walls of the pressure compartments, two elongated force transmitting members respectively anchored to the two thin opposite walls of the cavity at the angled first extremities thereof and respectively connected to the two thin partitioning walls of the pressure compartments at the angled second extremities thereof, and a stack of a piezo electric disc element, and a pair of split electrode discs sandwiching the piezo electric disc disposed within the cavity in a compressed relationship intermediate the two thin opposite walls of the cavity.

Yet another object is to provide the oscillatory pressure transducer described in the afore-mentioned primary object of the present invention; wherein the piezo electric relative motion sensor comprises a pair of piezo electric absolute motion sensors respectively detecting absolute deflection of the two thin partitioning walls of the pressure compartments, and the relative deflection between the two thin partitioning walls of the pressure compartments is obtained by combining two alternating electrical signals respectively generated by the pair of absolute piezo electric motion sensors, wherein the resultant alternating electrical represents the oscillation in the fluid pressure.

Yet a further object is to provide the oscillatory pressure transducer described in the afore-mentioned a further object of the present invention; wherein each of the pair of piezo electric absolute motion sensors comprises a stack of a piezo electric disc element and a pair of split electrode discs sandwiching the piezo electric disc element disposed within a cavity included in a piezo electric element container vessel, which cavity has a thin end wall perpendicular to each of the two thin partitioning walls of the pressure compartments, in a pressurized relationship against the thin end wall, and an elongated force transmitting member extending from the thin end wall of the cavity with an angled extremity anchored to each of the two thin partitioning walls of the pressure compartments.

Still another further object is to provide the oscillatory pressure transducer described in the afore-mentioned a further object of the present invention; wherein each of the pair of piezo electric absolute motion sensors comprises a stack of a piezo electric disc element and a pair of split electrode discs sandwiching the piezo electric disc element disposed within a cavity included in a piezo electric element container vessel, which cavity has a thin end wall perpendicular to and straddling each of the two thin partitioning walls of the pressure compartments, in a pressurized relationship against the thin end wall, wherein each of the two thin partitioning walls of the pressure compartments and the thin end wall of the cavity are fixedly connected to one another in a joint having a T-shaped cross sectional geometry.

Still a further object is to provide an oscillatory pressure transducer comprising first and second pressure compartments separated from one another by a thin partitioning wall, and a piezo electric absolute motion sensor detecting the deflection of the thin partitioning wall, wherein the first and second pressure compartments include two pressure ports respectively introducing two fluid pressures into the first and second pressure compartments. An alternating electrical signal generated by the piezo electric absolute motion sensor represents the oscillation in the fluid pressure introduced into at least one of the first and second pressure compartments.

Yet still another object is to provide the oscillatory pressure transducer described in the afore-mentioned still another object of the present invention; wherein the piezo electric absolute motion sensor comprises a stack of a piezo electric disc element and a pair of split electrode discs sandwiching the piezo electric disc element disposed within a cavity included in a piezo electric element container vessel, which cavity has a thin end wall perpendicular to the partitioning wall of the pressure compartments in a pressurized relationship against the thin end wall, and an elongated force transmitting member extending from the thin end wall of the cavity with an angled extremity anchored to the thin partitioning wall of the pressure compartments.

Yet still a further object is to provide the oscillatory pressure transducer described in the afore-mentioned still another object of the present invention; wherein the piezo electric absolute motion sensor comprises a stack of a piezo electric disc element and a pair of split electrodes sandwiching the piezo electric disc element disposed within a cavity included in a piezo electric element container vessel, which cavity has a thin end wall perpendicular to and straddling the thin partitioning wall of the pressure compartments, in a pressurized relationship against the thin end wall, wherein the thin partitioning wall of the pressure compartments and the thin end wall of the cavity are fixedly connected to one another in a joint having a T-shaped cross sectional geometry.

These and other objects of the present invention will become clear as the description of the invention progresses.

BRIEF DESCRIPTION OF FIGURES

The present invention may be described with a greater clarity and specificity by referring to the following figures.

DESCRIPTION OF ILLUSTRATED EMBODIMENTS

Figures 1, 2, 3, 4, 5:
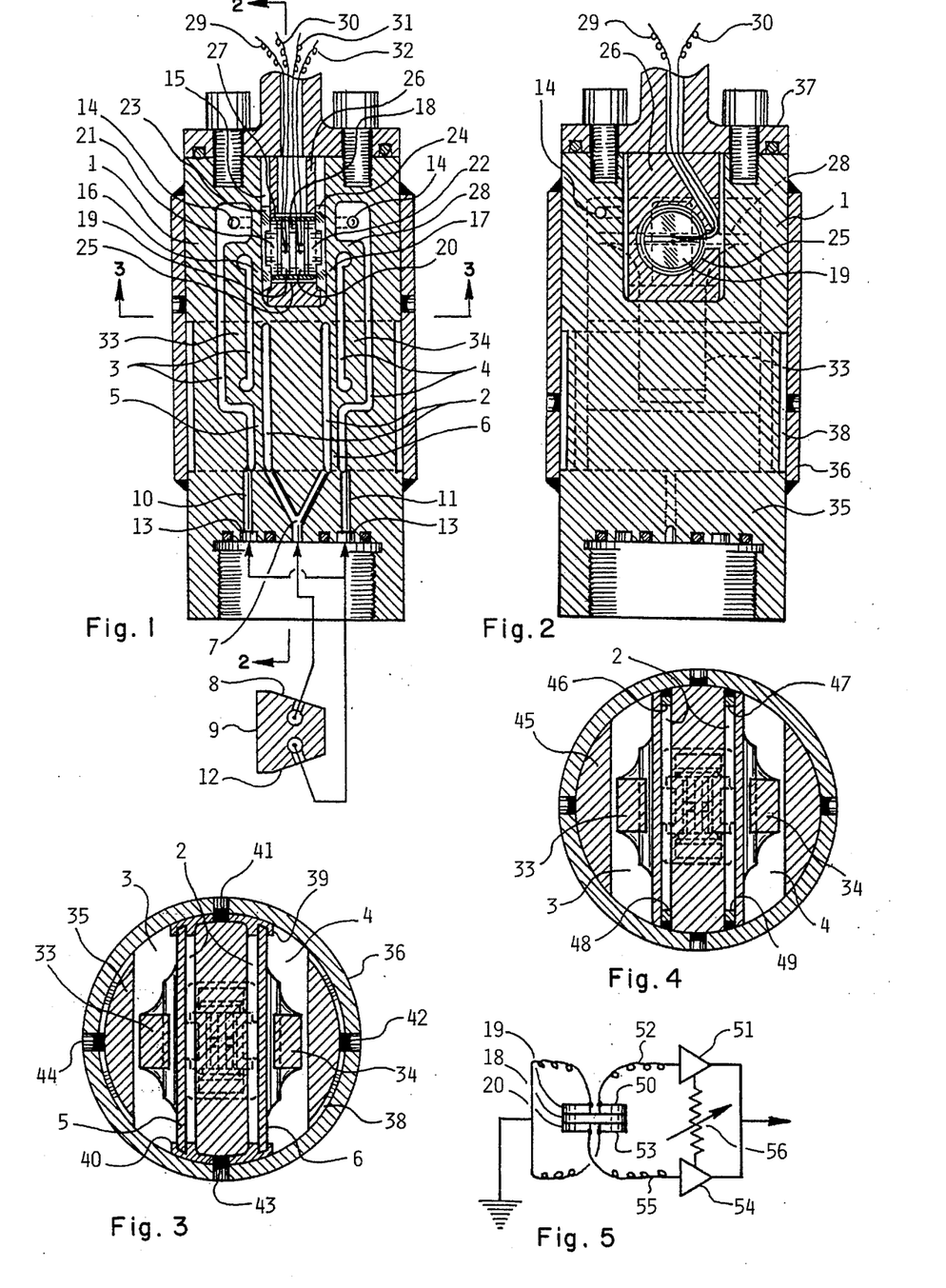
FIG. 1 illustrates a cross section of an embodiment of the oscillatory pressure transducer of the present invention.
FIG. 2 illustrates another cross section of the oscillatory pressure transducer shown in FIG. 1.
FIG. 3 illustrates a further cross section of the oscillatory pressure transducer shown in FIG. 1.
FIG. 4 illustrates a modified version of the cross section of the oscillatory pressure transducer shown in FIG. 3.
FIG. 5 illustrates an embodiment of the assembly of a piezo electric disc element employed in the construction of the oscillatory pressure transducer shown in FIG. 1 and an electronic circuit combining two alternating electrical signals respectively supplied by two electrodes of the piezo electric disc element.

In FIG. 1 there is illustrated a cross section of an embodiment of the oscillatory pressure transducer comprising a pair of thin deflective partitioning walls and a piezo electric relative motion sensor detecting the relative deflection between the pair of thin deflective partitioning walls. The transducer body 1 includes a first pressure compartment 2 disposed between a second pressure compartment 3 and a third pressure compartment 4, wherein the first pressure compartment 2 is separated from the second and third pressure compartments 3 and 4 respectively by two thin deflective partitioning walls 5 and 6. A first pressure port 7 introduces a fluid pressure such as that existing at one cylindrical side 8 of a vortex-generating bluff body 9 into the first pressure compartment 2, while a second pressure port 10 and 11 introduces another fluid pressure such as that existing at the other cylindrical side 12 of the vortex-generating bluff body 9 into the second and third pressure compartments 3 and 4. It should be understood that the two planar cavities included in the first pressure compartment 2 function as single pressure compartment as the two planar cavities are open to one another by means of the first pressure port 7, and that the second and third pressure compartment 3 and 4 constitutes a single pressure compartment as the second and third pressure compartments 3 and 4 are open to one another by means of the second pressure port 10 and 11 branching off from a common pressure inlet annular groove 13 or by means of a pressure communicating hole 14. The transducer body 1 also includes a cavity 15 sealed off from the pressure compartments 2, 3 and 4, which cavity 15 has two opposite thin deflective walls 16 and 17, disposed parallel to and straddling a plane of symmetry located intermediate and parallel to the two thin deflective partitioning walls 5 and 6. A piezo electric element assembly including a stack combination of a piezo electric disc 18 sandwiched between a pair of split electrode discs 19 and 20, and a pair of back-up discs 21 and 22 is disposed within the cavity 15 in a compressed relationship between the two opposite thin deflective walls 16 and 17. A pair of shim plates 23 and 24 engaging two channels respectively included in the faces of the two back-up discs 21 and 22 facilitates the compressed placement of the piezo electric element assembly intermediate the two opposite thin deflective walls 16 and 17 of the cavity 15. It should be understood that the back-up discs 21 and 22 are respectively insulated from the two split electrode discs 19 and 20 by a pair of insulating discs. The piezo electric element assembly is disposed within an opening 25 extending through the piezo electric element assembly holder 26. An insulating tape 27 wrapping the cylindrical surface of the piezo electric element assembly insulates the piezo electric element assembly from the holder 26. Each of the two opposite thin deflective walls 16 and 17 of the cavity 15 has a reinforcing rib 28 disposed on a reference plane perpendicular to the two thin deflective partitioning walls 5 and 6, wherein the center line of the piezo electric element assembly is disposed substantially on the reference plane and the two electrodes constituting each of the pair of split electrode discs 19 and 20 are located respectively on two opposite sides of the reference plane. The four lead wires 29, 30, 31, and 32 respectively extend from the four electrodes included in the piezo electric element assembly and out of the transducer body 1. The reinforcing rib 28 included in each of the two opposite thin deflective walls 16 and 17 of the cavity 15 is connected to a deflective portion of each of the two thin deflective partitioning walls 5 and 6 of the pressure compartments by one of two force transmitting members 33 and 34, as the two opposite extremities of the force transmitting member are respectively anchored to the reinforcing rib 28 of the deflective wall of the cavity 15 and to a deflective central portion of the thin deflective partitioning wall of the pressure compartments. It is readily noticed that the piezo electric element assembly functions as a relative motion sensor detecting the relative deflection between the two thin deflective partitioning walls 5 and 6.

In FIG. 2, there is illustrated another cross section of the oscillatory pressure transducer shown in FIG. 1, which cross section taken along plane 2—2 as shown in FIG. 1 further illustrates the arrangement of one 19 of the two split electrode discs 19 and 20 included in the piezo electric element assembly disposed within the circular opening extending through the holder 26, one of the two reinforcing ribs 28, and one 33 of the two force transmitting members 33 and 34. This cross section view also shows the routing of the lead wires 29, 30, etc. extending from the electrodes included in the piezo electric element assembly. It should be noticed that the piezo electric element assembly engages the opening 25 included in the holder 26 in a clearance relationship, whereby the relative deflection between the two thin deflective partitioning walls 5 and 6 of the pressure compartments respectively compresses and decompresses the two opposite halves of the piezo electric element assembly respectively located on two opposite sides of the reference plane, which reference plane includes the reinforcing ribs 28 of the two opposite thin deflective walls 16 and 17 of the cavity 15. It should be noticed that the transducer body 1 comprises a welded assembly of core cylinder 35 and the cylindrical shell 36, and an end cap 37 enclosing the cavity 15. The outer cylindrical surface of the core cylinder is turned down to a slightly smaller diameter 38 over the length of the first pressure compartment 2.

In FIG. 3 there is illustrated a further cross section of the oscillatory pressure transducer shown in FIG. 1, which cross section taken along plane 3—3 as shown in FIG. 1 illustrates an embodiment of machining and fabrication of the transducer body assembly. The core cylinder 35 is machined by using a wire electric discharge machine and a milling machine to form the pressure compartments 2, 3 and 4, and the pair of elongated force transmitting members 33 and 34. A pair of sheet metal strips 39 and 40 crimp-formed and fitted into the turned-down section 38 of the core cylinder 35 secures the edges of the two thin deflective partitioning walls 5 and 6 in a retaining and substantially leak-proof relationship. The combination of the core cylinder 35 and the pair of sheet metal strips 39 and 40 are pressed into the cylindrical shell 36 and welded together. Various plug welds 41, 42, 43, 44, etc. provide a rigid weld assembly for the transducer body 1 and minimize any internal relative mechanical vibrations between the parts assembled into the transducer body 1. It should be mentioned that the above-described machining of the core cylinder 35 by using the wire electric discharge machine and the weld assembly of the transducer body 1 provide the pressure compartments 2, 3 and 4 respectively having the minimum possible cavity volumes, which prevent the occurrence of air cavity resonance of a gaseous medium occupying the cavity volumes and thus prevent the generation of the noise electrical signal by the piezo electric element assembly.

In FIG. 4, there is illustrated an alternative design that accomplishes the same end result as that provided by the transducer body assembly shown in FIG. 3. In this particular embodiment of the transducer body assembly, the turning down of the core cylinder 45 to a reduced diameter is omitted and the edges of the pressure compartment 2 are closed by welds, wherein the weld back-up rods 46, 47, 48 and 49 may or may not be employed.

In FIG. 5, there is illustrated an embodiment of the piezo electric element assembly employed in the construction of the oscillatory pressure transducer shown in FIGS. 1 and 2, and an electronic circuit combining two alternating electrical signals respectively supplied by two electrodes included in the piezo electric element assembly. Each of the pair of split electrode discs 19 and 20 sandwiching the piezo electric disc 18 has two semi-circular electrodes respectively located on two opposite sides of the reference plane, on which reference plane the reinforcing ribs 28 of the two opposite thin deflective walls 16 and 17 of the cavity 15 are disposed as shown in FIG. 1. One electrode adjacent on one side face of the piezo electric disc 18 and located on one side of the reference plane is connected to a first operational amplifier 51 by a lead wire 52, and another electrode 53 adjacent to the other side face of the piezo electric disc 18 and located on the other side of the reference plane is connected to a second operational amplifier 54 by a lead wire 55. The other electrodes not connected to the operational amplifiers 51 and 54 are grounded. The two output signals from the two operational amplifiers 51 and 54 are additively combined by using parallel resistors or a summing amplifier in such a way that the noise is cancelled therebetween and a refined resultant alternating electrical signal representing the oscillation in the fluid pressure existing in one or both of the fluid pressures respectively introduced into the pressure compartments 2 and 3 is obtained. The electric circuit may have signal level balancing means 56 between the outputs from the two operational amplifiers 51 and 54, which signal balancing means including one or a pair of variable resistors, is used to cancel the noise and obtain the refined resultant alternating electrical signal representing the oscillation in the fluid pressure.

Figure 6:
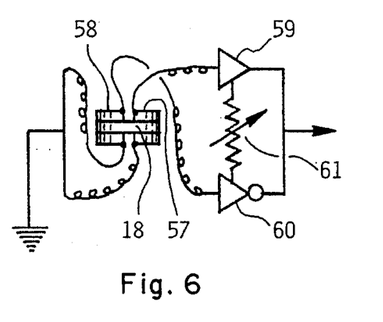
FIG. 6 illustrates another embodiment of the assembly of a piezo electric disc element and an electronic circuitry combining two alternating electrical signals respectively supplied by two electrodes of the piezo electric disc element.

In FIG. 6, there is illustrated another embodiment of the piezo electric element assembly and an electronic circuit, which combination provides the same end result as that of the embodiment shown in FIG. 5. Two electrodes 57 and 58 adjacent to the same side face of the piezo electric disc 18 and located respectively on two opposite sides of the reference plane are respectively connected to a noninverting amplifier 59 and an inverting amplifier 60, which combination of the amplifiers 59 and 60 includes the signal level balancing means 61. The resultant alternating electrical signal representing the oscillation in the fluid pressure is obtained by additively combining the two output signals from the two amplifiers 59 and 60.

Figure 7:
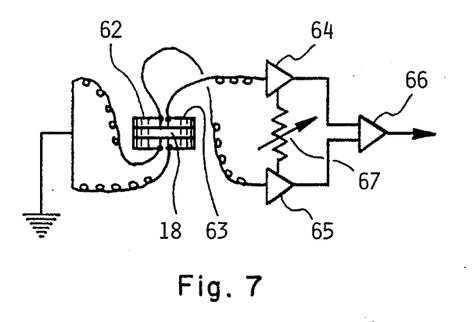
FIG. 7 illustrates a further embodiment of the assembly of a piezo electric disc element and an electronic circuitry combining two alternating electrical signals respectively supplied by two electrodes of the piezo electric disc element.

In FIG. 7, there is illustrated a further embodiment of the piezo electric element assembly and an electric circuit, which can replace the embodiment shown in FIG. 5 or 6. Two electrodes 62 and 63 adjacent to the same side of the piezo electric disc 18 and located respectively on two opposite sides of the reference plane are respectively connected to two operational amplifiers 64 and 65, and the output signals from the two operational amplifiers 64 and 65 are differentially combined by using a differential amplifier 66 to obtain the resultant alternating electrical signal representing the oscillation in the fluid pressure. The signal level balancing means 67 comprising one or a pair of variable resistors is used to cancel out the noise between the two output signals from the two operational amplifiers 64 and 65. It should be noticed that, in the embodiments shown in FIGS. 6 and 7, one of the two electrode discs including the two ground electrodes may not have the split construction.

Figure 8:
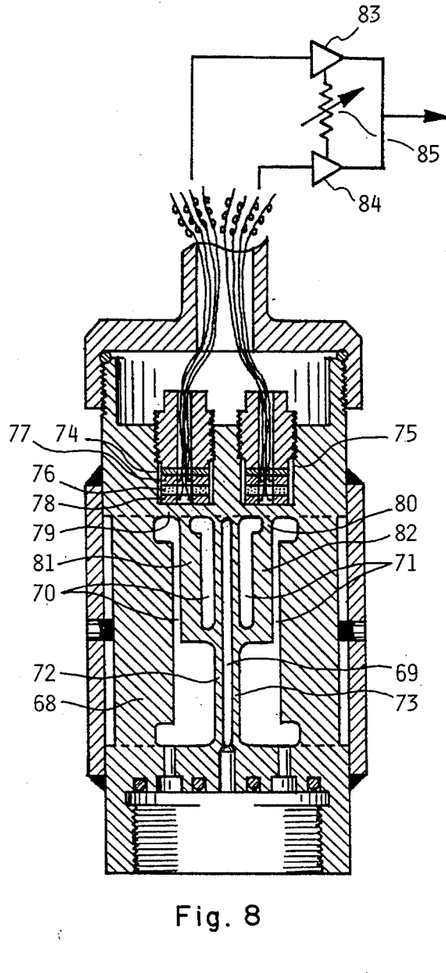
FIG. 8 illustrates a cross section of another embodiment of the oscillatory pressure transducer of the present invention.

In FIG. 8, there is illustrated a cross section of another embodiment of the oscillatory pressure transducer, wherein the transducer body 68 includes a first pressure compartment 69 disposed intermediate and separated respectively from a second and third pressure compartments 70 and 71 by two thin deflective partitioning walls 72 and 73, which combination of the pressure compartments are put together in a manner similar to the arrangement shown and described in conjunction with FIGS. 1, 2 and 3. A pair of piezo electric element assemblies are respectively disposed within two cavities 74 and 75, each of which pair of piezo electric element assemblies include a stacked combination of a piezo electric disc 76 sandwiched between a pair of split electrode discs 77 and 78, which combination is compressed against a thin deflective end wall 79 of the cavity 74 or 75. The thin deflective end wall 79 of the cavity 74 or 75 includes a reinforcing rib 80 disposed on a reference plane including the center line of the stacked combination of the piezo electric disc 76 and the pair of split electrode discs 77 and 78, and parallel to the plane of symmetry located intermediate and parallel to the two thin deflective partitioning walls 72 and 73 of the pressure compartments. Each of the two elongated force transmitting members 81 and 82 connects a deflective central portion of each of the two thin deflective partitioning walls 72 and 73 to the reinforcing rib 80 of the thin deflective end wall 79 of each of the two cavities 74 and 75. The piezo electric element assembly disposed within each of the two cavities 74 and 75 may have the construction and the electric circuit shown in one of the three embodiments shown and described in conjunction with FIGS. 5, 6 and 7. The resultant alternating electrical signals from the two piezo electric element assemblies respectively contained in the two cavities 74 and 75 are combined by using a summing amplifier or a combination of two amplifiers 83 and 84 with a signal level balancing means 85 in a manner described in conjunction with FIG. 5, 6 or 7. In an alternative design, each of the pair of piezo electric element may include a back-up disc without the shimming plate employed in the embodiment illustrated in FIG. 1, that is now disposed intermediate the split electrode disc 78 and the thin deflective end wall 79 of the cavity. It should be noticed that the combination of the pair of piezo electric element assemblies employed in the particular embodiment shown in FIG. 8 functions as a relative motion sensor detecting the relative deflection between the two thin deflective partitioning walls 72 and 73, while each of the pair of piezo electric element assemblies functions as an absolute motion sensor detecting the deflection of each of the two thin deflective partitioning walls 72 and 73. The resultant output alternating electrical signal provided by the piezo electric relative motion sensor employed in the particular embodiment of the oscillatory pressure transducer represents the oscillation in the fluid pressure existing in one or both of the fluid pressures respectively introduced into the pressure compartment 69 and the combination of the pressure compartments 70 and 71.

Figure 9:
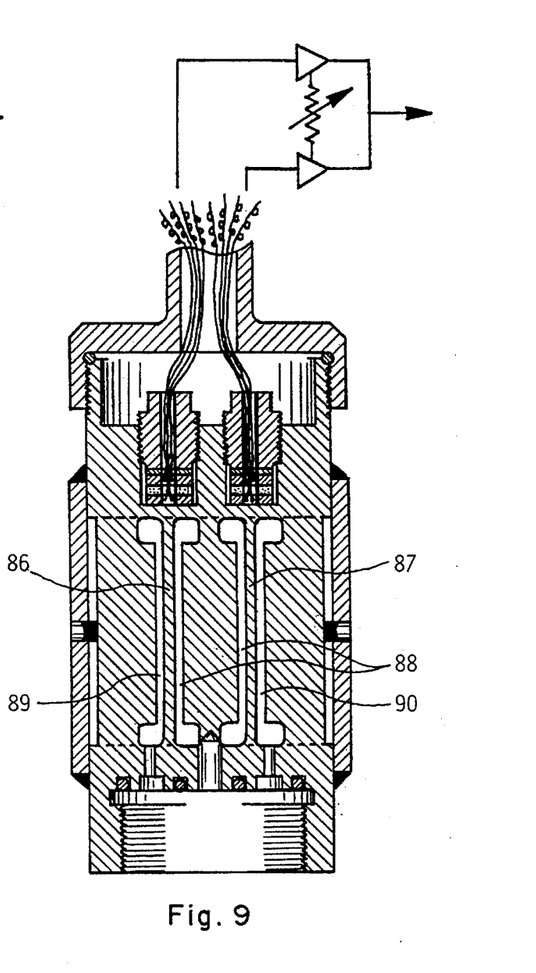
FIG. 9 illustrates a cross section of a further embodiment of the oscillatory pressure transducer of the present invention.

In FIG. 9, there is illustrated a cross section of a further embodiment of the oscillatory pressure transducer, which has essentially the same construction and operating principles as those of the embodiment illustrated in FIG. 8 with one exception that the elongated force transmitting members 81 and 82 employed in the embodiment shown in FIG. 8 are now omitted and the thin deflective partitioning walls 86 and 87 separating the pressure compartment 88 respectively from the pressure compartments 89 and 90 are now located at the locations initially occupied by the two elongated force transmitting members 81 and 82 as shown in the embodiment shown in FIG. 8.

Figure 10:
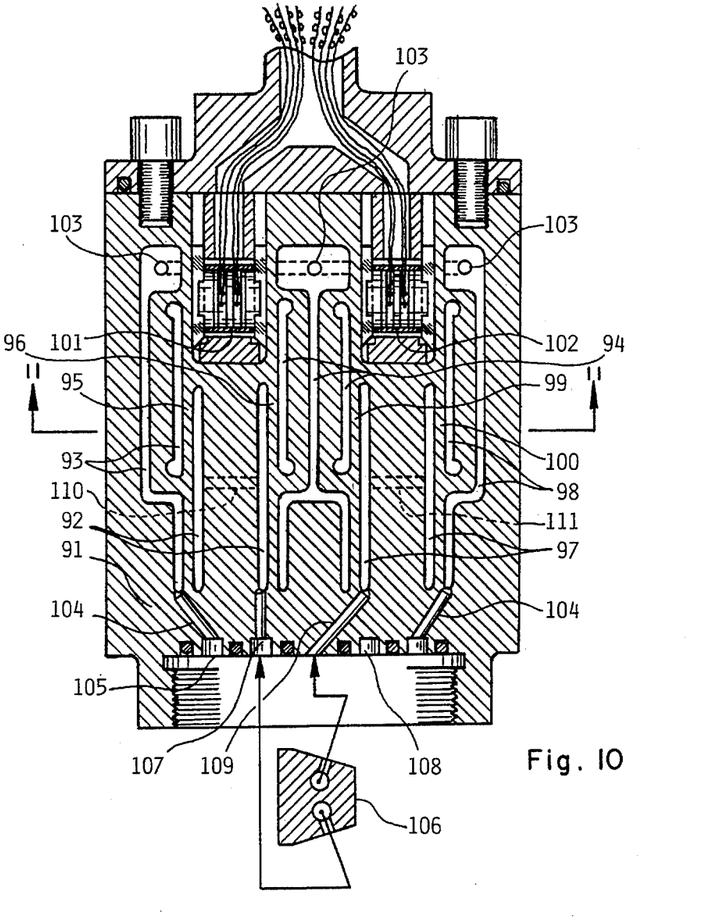
FIG. 10 illustrates a cross section of yet another embodiment of the oscillatory pressure transducer of the present invention.

In FIG. 10, there is illustrated a cross section of yet another embodiment of the oscillatory pressure transducer, wherein the transducer body 91 includes a first pressure compartment 92 disposed intermediate and separated respectively from a second and third pressure compartments 93 and 94 by two thin deflective partitioning walls 95 and 96, and a fourth pressure compartment 97 disposed intermediate and separated respectively from the third and a fifth pressure compartments 94 and 98 by two thin deflective partitioning walls 99 and 100. A first piezo electric relative motion sensor 101 detects the relative deflection between the two thin deflective partitioning walls 95 and 96, and a second piezo electric relative motion sensor 102 detects the relative deflection between the two thin deflective partitioning walls 99 and 100, wherein the two piezo electric relative motion sensors 101 and 102 respectively operate on the same principles as those of the piezo electric relative motion sensor included in the embodiment shown and described in conjunction with FIG. 1. The pressure compartments 93, 94 and 98 are open to each other by means of a pressure communicating hole 103, which combination of the pressure compartments 93, 94 and 98 includes a vent port 104 open to a pressure receiving groove 105 of an annular geometry receiving a nonfluctuating pressure such as the fluid pressure existing at a location upstream to the vortex-generating bluff body 106. The first pressure port 107 introduces a fluid pressure such as that existing at one cylindrical side of the bluff body 106 and transmitted through a pressure receiving annular groove 108 into the pressure compartment 92, while a second pressure port 109 introduces another fluid pressure such as that existing at the other cylindrical side of the bluff body 106 into the pressure compartment 97. The two planar cavities included in each of the two pressure compartments 92 and 97 are connected to one another by each of the two pressure communicating holes 110 and 111. The two resultant alternating electrical signals respectively provided by the two piezo electric relative motion sensors 101 and 102 are combined in the manner described in conjunction with FIG. 8 to obtain a refined output alternating electrical signal representing the oscillation in the fluid pressure existing in one or both of the fluid pressures respectively introduced into the pressure compartments 92 and 97. Of course, the oscillation in the fluid pressure tapped through pressure holes included in the vortex-generating bluff body as shown in FIG. 1 or 10 has the same frequency as the frequency of vortex shedding from the vortex-generating bluff body, which frequency is proportional to the fluid velocity and, consequently, the fluid velocity can be determined as a function of the frequency of oscillation in the fluid pressure measured by using the oscillatory pressure transducer of the present invention. It should be noticed that the oscillatory pressure transducer shown in FIG. 10 is quite similar to a parallel combination of a pair of the oscillatory pressure transducer shown in FIG. 1.

Figure 11:
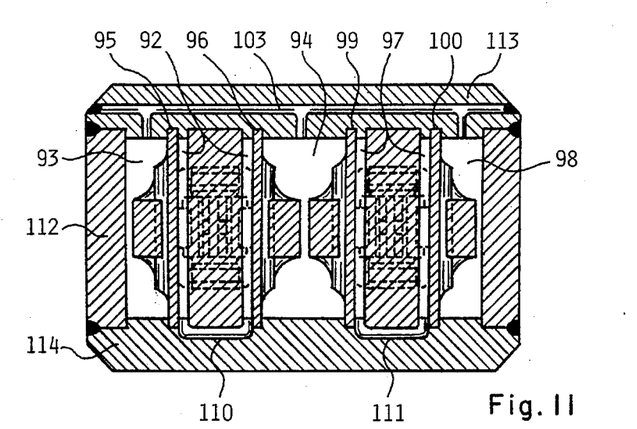
FIG. 11 illustrates another cross section of the oscillatory pressure transducer shown in FIG. 10.

In FIG. 11, there is illustrated another cross section of the oscillatory pressure transducer shown in FIG. 10, which cross section taken along plane 11—11 as shown in FIG. 10 illustrates the arrangement of the pressure communicating hole 103 connecting the pressure compartments 93, 94 and 98 to each other, and the pressure communicating holes 110 and 111 connecting the two planar cavities to one another included in each of the two pressure compartments 92 and 97. It should be noticed that the structural elements equivalent to those included in the core cylinder 45 employed in the construction of the transducer body shown in FIG. 4 is now included in a block 112, and a pair of plates 113 and 114 are weld connected respectively to two opposite side faces of the block 112 in closing the edges of the pressure compartments 92, 93, 94, 97 and 98 and in retaining the edges of the thin deflective partitioning walls 95, 96, 99 and 100.

Figure 12:
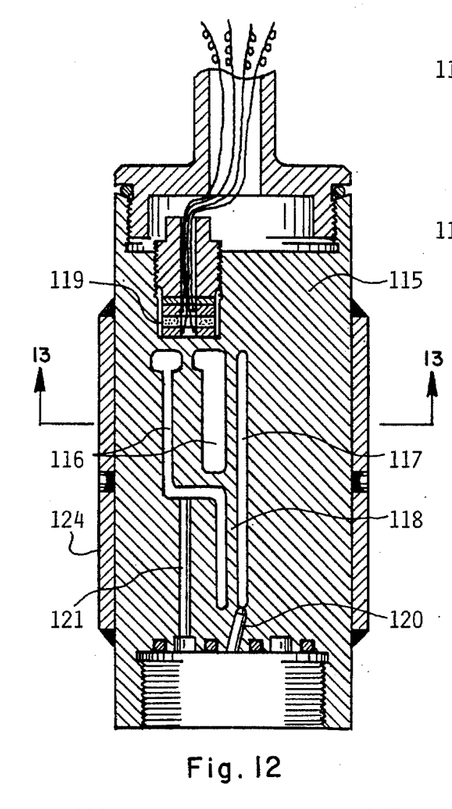
FIG. 12 illustrates a cross section of yet a further embodiment of the oscillatory pressure transducer of the present invention.

In FIG. 12, there is illustrated a cross section of yet a further embodiment of the oscillatory pressure transducer, wherein the transducer body 115 includes a pair of pressure compartments 116 and 117 separated from one another by a thin deflective partitioning wall 118. A piezo electric absolute motion sensor 119 having the same construction and operating principles as those of each of the pair of piezo electric absolute motion sensor shown and described in conjunction with FIG. 8 detects the deflection of the thin deflective partitioning wall 118 and puts out an output alternating electrical signal representing the oscillation in the fluid pressure existing in one or both of the fluid pressures respectively introduced into the pressure compartments 116 and 117 through two pressure ports 120 and 121, respectively. It is readily recognized that the oscillatory pressure transducer shown in FIG. 12 comprising one half of of the elements included in the oscillatory pressure transducer shown in FIG. 8 is an economic alternative to the oscillatory pressure transducer shown in FIG. 8.

Figure 13:
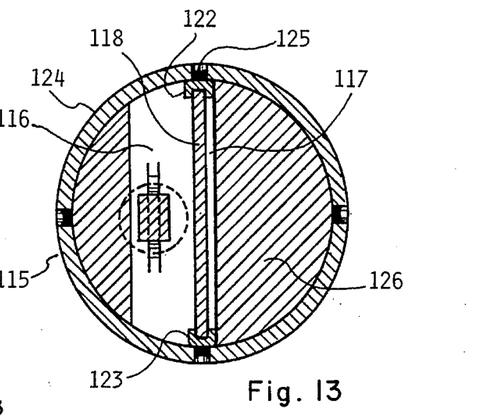
FIG. 13 illustrates another cross section of the oscillatory pressure transducer shown in FIG. 12.

In FIG. 13, there is illustrated another cross section of the oscillatory pressure transducer shown in FIG. 12, which cross section taken along plane 13—13 as shown in FIG. 12 illustrates a structural arrangement securing the edges of the thin deflective partitioning wall 118 in a retaining and substantially leak-proof relationship. A pair of sheet metal strips 122 and 123 with a crimped cross sectional geometry having a groove receiving the edge of the thin deflective partitioning wall 118 in a retaining and substantially leak-proof relationship are weld connected to the cylindrical shell 125 by means of a plurality of plug welds 125, into which cylindrical shell 124 the combination of the core cylinder 126 and the pair of sheet metal strips 122 and 123 are pressure fitted and welded thereto, which welded assembly of the transducer body 115 is put together in a manner similar to that described in conjunction with FIG. 3.

Figure 14:
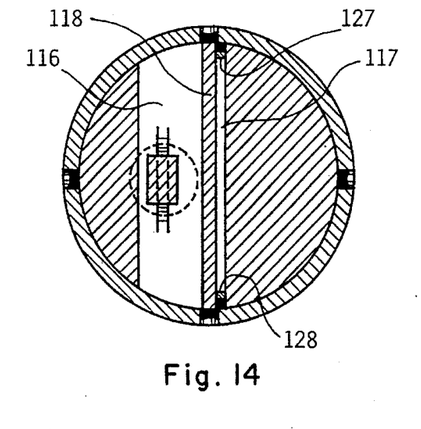
FIG. 14 illustrates a modified version of the cross section of the oscillatory pressure transducer shown in FIG. 13.

In FIG. 14, there is illustrated an alternative design that accomplishes the same end result as that provided by the transducer body assembly shown in FIG. 13. In this particular embodiment, the edges of the pressure compartments 117 are closed by welds, wherein the weld back-up rods 127 and 128 may or may not be employed depending on the gap width in the edges of the pressure compartment 117.

Figure 15:
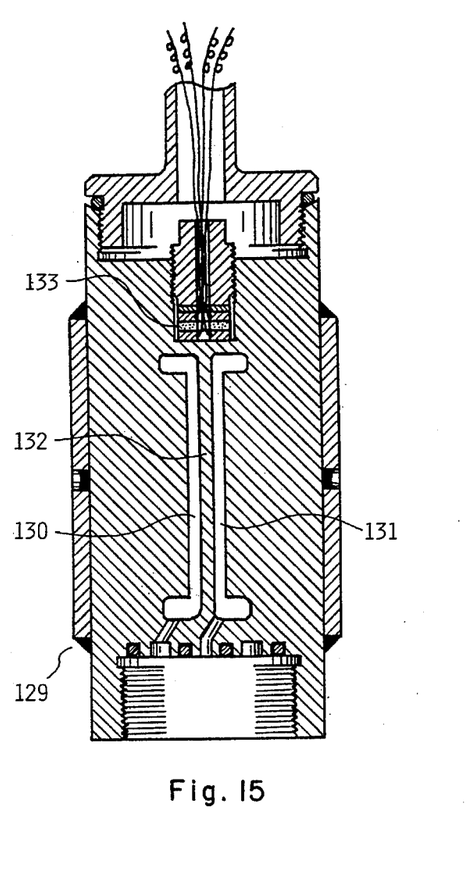
FIG. 15 illustrates a cross section of still another embodiment of the oscillatory pressure sensor of the present invention.

In FIG. 15, there is illustrated a cross section of still another embodiment of the oscillatory pressure transducer, wherein the transducer body 129 includes two pressure compartments 130 and 131 separated from one another by a thin deflective partitioning wall 132. A piezo electric absolute motion sensor 133 detecting the deflection of the thin deflective partitioning wall 132 provides an output alternating electrical signal representing the oscillation in the fluid pressure existing in one or both of the fluid pressures respectively introduced into the pressure compartments 130 and 131, wherein the piezo electric absolute motion sensor has the same construction and operating principles as those of each of the pair of piezo electric absolute motion sensors shown and described in conjunction with FIG. 9. This particular embodiment of the oscillatory pressure transducer comprising one half of the elements included in the oscillatory pressure transducer shown in FIG. 9 is an economic version of the oscillatory pressure transducer illustrated and described in conjunction with FIG. 9.

While the principles of the present invention have now been made clear by the illustrative embodiments shown and described, there will be many modifications of the structures, arrangements, proportions, elements and materials, which are immediately obvious to those skilled in the art and particularly adapted to the specific working environments and operating conditions in the practice of the invention without departing from those principles. It is not desired to limit the invention to the illustrative embodiments shown and described and accordingly, all suitable modifications and equivalents may be regarded as falling within the scope of the invention as defined by the claims which follow.

The embodiments of the invention, in which an exclusive property or privilege is claimed, are defined as follows:

1. An apparatus for converting an oscillation in fluid pressure into an alternating electrical signal comprising in combination:

a) a transducer body including a first pressure compartment disposed intermediate a second and third pressure compartment, wherein a first thin partitioning wall separates the first and second pressure compartments from one another and a second thin partitioning wall separates the first and third pressure compartments from one another, b) means for introducing a fluid pressure into the first pressure compartment, means for introducing a fluid pressure into the second compartment and means for introducing fluid pressure into the third pressure compartment;

c) a relative vibratory motion sensor comprising at least one piezo electric disc with at least a pair of electrodes detecting a relative vibratory deflection between the first and second thin partitioning walls, and converting the relative vibratory deflection into an alternating electrical signal representing oscillation in fluid pressure existing in at least one of the fluid pressures respectively introduced into the first, second and third pressure compartments.

2. An apparatus as defined in claim 1 wherein the second and third pressure compartments are open to one another.

3. An apparatus as defined in claim 1 wherein the means for introducing fluid pressure into the first pressure compartment receives a first fluid pressure and the means for introducing fluid pressure into the second and third pressure compartments receive a second fluid pressure.

4. An apparatus as defined in claim 3 wherein the first and second fluid pressures are fluid pressures respectively existing at two opposite cylindrical sides of a vortex-generating bluff body, wherein the alternating electrical signal provided by the relative vibratory motion sensor represents vortex shedding from the vortex-generating bluff body.

5. An apparatus as defined in claim 1 wherein the relative vibratory motion sensor comprises:
  a) a cavity included in the transducer body in a relationship sealed off from the fluid pressures introduced into the pressure compartments, wherein said cavity includes two opposite thin walls;
  b) a pair of force transmitting members, each of said pair of force transmitting members extending from each of the two opposite thin walls of the cavity in an angled relationship and connected to a deflective portion of each of the first and second thin partitioning walls; wherein said at least one piezo electric disc with at least a pair of electrodes is disposed within the cavity in a relationship compressed between the two opposite thin walls of the cavity and straddling a reference plane perpendicularly intersecting with the two opposite thin walls of the cavity through root sections of the pair of force transmitting members respectively anchored to the two opposite thin walls of the cavity in a relationship traversing the pair of force transmitting members, wherein said at least a pair of electrodes are respectively disposed on two opposite sides of the reference plane, and respectively supply two electrical signals; and
  c) means for combining the two electrical signals respectively supplied by said at least a pair of electrodes into said alternating electrical signal representing the oscillation in fluid pressure.

6. An apparatus as defined in claim 5 wherein the second and third pressure compartments are open to one another.

7. An apparatus as defined in claim 5 wherein the means for introducing Fluid pressure into the first pressure compartment receives a first fluid pressure, and the means for introducing fluid pressure into the second and third pressure compartments receive a second fluid pressure.

8. An apparatus as defined in claim 7 wherein the first and second fluid pressures are fluid pressures respectively existing at two opposite cylindrical sides of a vortex-generating bluff body, wherein the alternating electrical signal provided by the relative vibratory motion sensor represents vortex shedding from the vortex-generating bluff body.

9. An apparatus as defined in claim 1 wherein the relative vibratory motion sensor comprises a pair of piezo electric vibratory motion sensors respectively detecting vibratory deflections of the first and second thin partitioning walls, each of said pair of piezo electric vibratory motion sensors comprising:
  a) a cavity with a thin end wall included in the transducer body in a relationship sealed off from the fluid pressures introduced into the pressure compartments;
  b) a force transmitting member extending from the thin end wall of the cavity and connected to a deflective portion of each of the first and second thin partitioning walls;
  c) at least one piezo electric disc with at least a pair of electrodes disposed within the cavity in a relationship compressed against the thin end wall of the cavity and straddling a reference plane perpendicularly intersecting with the thin end wall of the cavity through a root section of the force transmitting member anchored to the thin end wall of the cavity, wherein said at least a pair of electrodes are respectively disposed on two opposite sides of the reference plane, and respectively supply two electrical signals; and
  d) means for combining the two electrical signals respectively supplied by said at least a pair of electrodes into an alternating electrical signal;
wherein said combination further includes means for combining two alternating electrical signals respectively supplied by the pair of piezo electric vibratory motion sensors into said alternating electrical signal representing the oscillation in fluid pressure.

10. An apparatus as defined in claim 9 wherein the means for introducing fluid pressure into the first pressure compartment receives a first fluid pressure, and the means for introducing fluid pressure into the second and third pressure compartments receive a second fluid pressure.

11. An apparatus as defined in claim 10 wherein the first and second fluid pressures are fluid pressures respectively existing at two opposite cylindrical sides of a vortex-generating bluff body, wherein the alternating electrical signal provided by the relative vibratory motion sensor represents vortex shedding from the vortex-generating bluff body.

12. An apparatus as defined in claim 1 wherein the relative vibratory motion sensor comprises a pair of piezo electric vibratory motion sensors respectively detecting vibratory deflections of the first and second thin partitioning walls, each of said pair of piezo electric vibratory motion sensors comprising:
  a) a cavity with a thin end wall included in the transducer body in a relationship sealed off from the fluid pressures introduced into the pressure compartments, wherein the thin end wall of the cavity and at least a portion of an edge of each of the first and second thin partitioning walls are joined to one another in a relationship having a T-shaped cross section;
  b) at least one piezo electric disc with at least a pair of electrodes disposed within the cavity in a relationship compressed against the thin end wall of the cavity and straddling a reference plane parallel to said each of the first and second thin partitioning walls and perpendicularly intersecting with the thin end wall of the cavity through the T-shaped junction between the thin end wall of the cavity and the thin partitioning wall, wherein said at least a pair of electrodes are respectively disposed on two opposite sides of the reference plane, and respectively supply two electrical signals; and
  c) means for combining the two electrical signals respectively supplied by said at least a pair of electrodes into an alternating electrical signal;
wherein said combination further includes means for combining two alternating electrical signals respectively supplied by the pair of piezo electric vibratory motion sensors into said alternating electrical signal representing the oscillation in fluid pressure.

13. An apparatus as defined in claim 12 wherein the means for introducing fluid pressure into the first pressure compartment receives a first fluid pressure, and the means for introducing fluid pressure into the second and third pressure compartments receive a second fluid pressure.

14. An apparatus as defined in claim 13 wherein the first and second fluid pressures are fluid pressures respectively existing at two opposite cylindrical sides of a vortex-generating bluff body, wherein the alternating electrical signal provided by the relative vibratory motion sensor represents vortex shedding from the vortex-generating bluff body.

15. An apparatus as defined in claim 5 wherein the transducer body includes a fourth pressure compartment disposed intermediate the third pressure compartment and a fifth pressure compartment, wherein a third thin partitioning wall separates the third and fourth pressure compartments from one another and a fourth thin partitioning wall separates the fourth and fifth pressure compartments from one another, and each of the fourth and fifth pressure compartments includes means for introducing a fluid pressure thereinto; wherein said combination further includes another relative vibratory motion sensor detecting relative vibratory deflection between the third and fourth thin partitioning walls, comprising:
   a) another cavity included in the transducer body in a relationship sealed off from the fluid pressures introduced into the pressure compartments, wherein said another cavity includes two opposite thin walls;
   b) a pair of force transmitting members, each of said pair of force transmitting members extending from each of the two opposite thin walls of the cavity in an angled relationship and connected to a deflective portion of each of the third and fourth thin partitioning thin walls;
   c) at least another piezo electric disc with at least a pair of electrodes disposed within said another cavity in a relationship compressed between the two opposite thin wall of said another cavity and straddling another reference plane perpendicularly intersecting with the two opposite thin walls of said another cavity and with root sections of the pair of force transmitting members respectively anchored to the two opposite thin walls of said another cavity perpendicularly to the pair of force transmitting members, wherein said at least a pair of electrodes are respectively disposed on two opposite sides of said another reference plane, and respectively supply two electrical signals;
   d) means for combining the two electrical signals respectively supplied by said at least a pair of electrodes into another alternating electrical signal; and
   e) means for combining the two alternating electrical signals respectively supplied by said a and another relative vibratory motion sensors into an output alternating electrical signal representing oscillation in fluid pressure existing in at least one of the pressures respectively introduced into the first and fourth pressure compartments.

16. An apparatus as defined in claim 15 wherein the second, third and fifth pressure compartments are open to each other.

17. An apparatus as defined in claim 15 wherein the means for introducing fluid pressure into the first pressure compartment receives a first fluid pressure and the means for introducing fluid pressure into the fourth pressure compartment receives a second fluid pressure.

18. An apparatus as defined in claim 17 wherein the first and second fluid pressures are fluid pressures respectively existing at two opposite cylindrical sides of a vortex-generating bluff body, and the means introducing fluid pressure to the second, third and fifth pressure compartments receive a fluid pressure existing in a region away from the two opposite cylindrical sides of the vortex-generating bluff body, wherein the output alternating electrical signal represents vortex shedding from the vortex-generating bluff body.

19. An apparatus for converting an oscillation in fluid pressure into an alternating electrical signal comprising in combination:
   a) a transducer body including two pressure compartments separated from one another by a thin partitioning wall, wherein each of the two pressure compartments includes means for introducing a fluid pressure thereinto;
   b) a cavity with a thin end wall included in the transducer body in a relationship sealed off from the fluid pressures introduced into the pressure compartments;
   c) a force transmitting member extending from the thin end wall of the cavity and connected to a deflective portion of the thin partitioning wall;
   d) at least one piezo electric disc with at least a pair of electrodes disposed within the cavity in a relationship compressed against the thin end wall of the cavity and straddling a reference plane perpendicularly intersecting with the thin end wall of the cavity through a root section of the force transmitting member anchored to the thin end wall of the cavity, wherein said at least a pair of electrodes are respectively located on two opposite sides of the reference plane, and respectively supply two electrical signals; and
   e) means for combining the two electrical signals respectively supplied by said at least a pair of electrodes into an alternating electrical signal representing oscillation in fluid pressure existing in at least one of the pressures respectively introduced into the two pressure compartments.

20. An apparatus for converting an oscillation in fluid pressure into an alternating electrical signal comprising in combination:
   a) a transducer body including two pressure compartments separated from one another by a thin partitioning wall, wherein each of the two pressure compartments includes means for introducing a fluid pressure thereinto;
   b) a cavity with a thin end wall included in the transducer body in a relationship sealed off from the fluid pressures introduced into the pressure compartments, wherein the thin end wall of the cavity and at least a portion of an edge of the thin partitioning wall are joined to one another in a relationship halving a T-shaped cross section;
   c) at least one piezo electric disc with at least a pair of electrodes disposed within the cavity in a relationship compressed against the thin end wall of the cavity and straddling a reference plane parallel to the thin partitioning wall and perpendicularly intersecting with the thin end wall of the cavity through the T-shaped junction between the thin end wall of the cavity and the thin partitioning wall, wherein said at least a pair of electrodes are respectively located on two opposite sides of the reference plane, and respectively supply two electrical signals; and
   d) means for combining the two electrical signals respectively supplied by said at least a pair of electrodes into an alternating electrical signal representing oscillation in fluid pressure existing in at least one of the pressures respectively introduced into the two pressure compartments.

* * * * *